Feb. 14, 1956  S. E. MEYERS  2,734,378
FILTERABILITY TESTING OF SUSPENSIONS OF SOLIDS IN A LIQUID
Filed Sept. 29, 1951  3 Sheets-Sheet 1
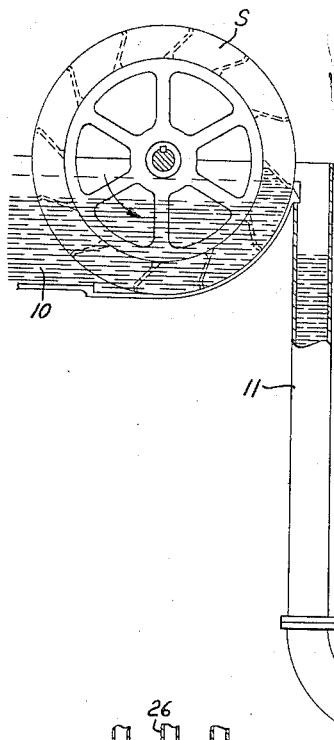
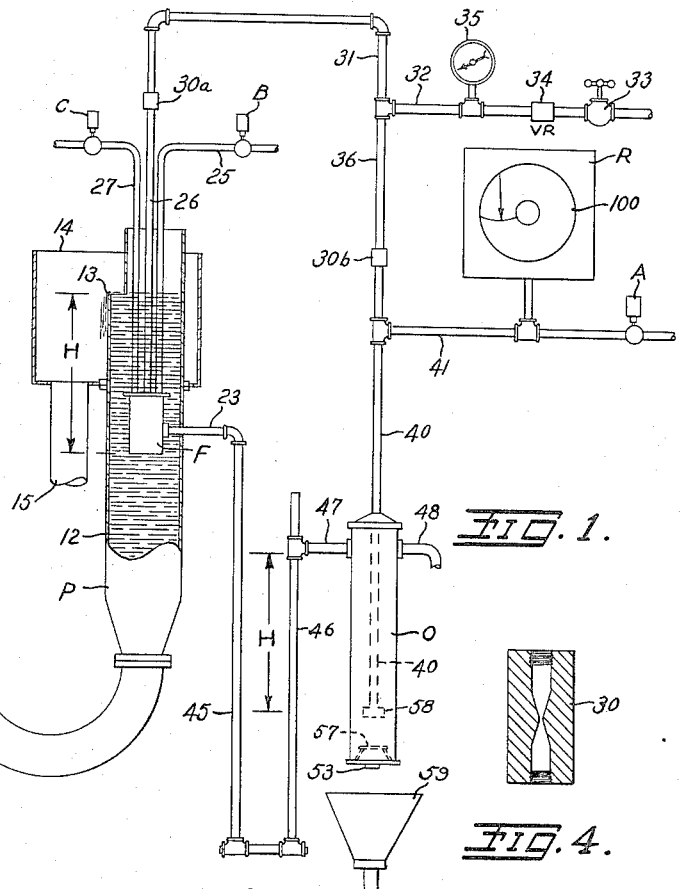
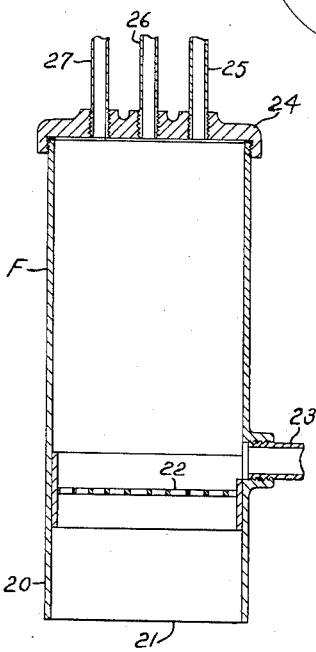
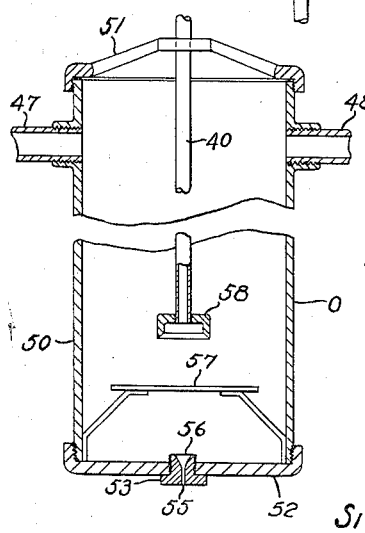
INVENTOR.
Sidney E. Meyers
BY
Cook and Schermerhorn
ATTORNEYS Feb. 14, 1956  S. E. MEYERS  2,734,378
FILTERABILITY TESTING OF SUSPENSIONS OF SOLIDS IN A LIQUID
Filed Sept. 29, 1951  3 Sheets-Sheet 2
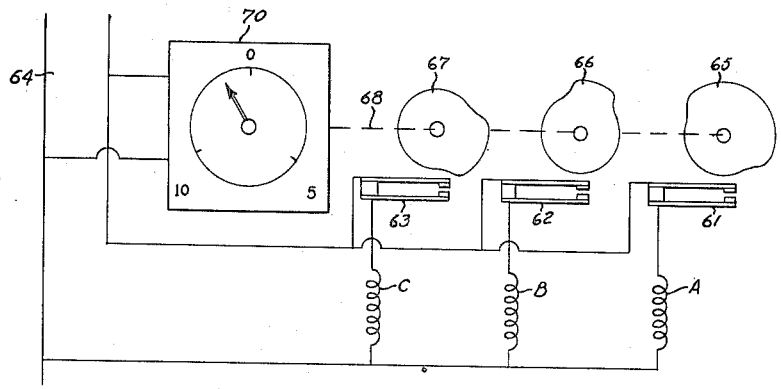
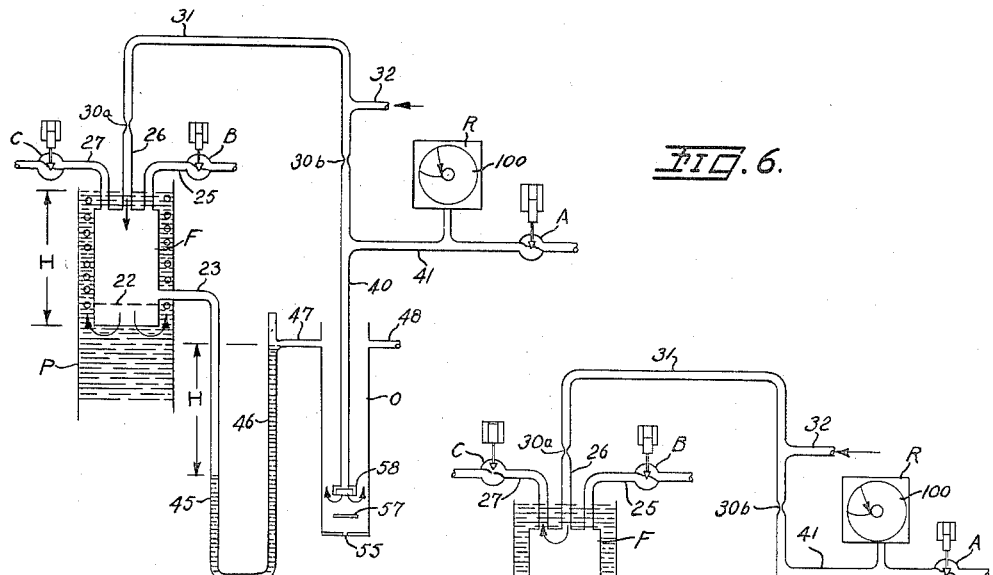
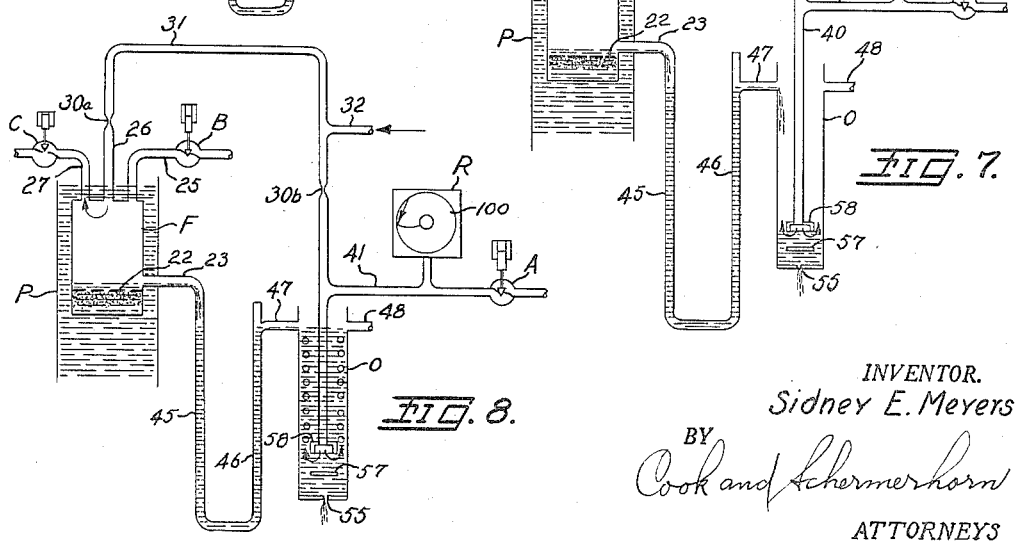
INVENTOR.
Sidney E. Meyers
BY
Cook and Schermerhorn
ATTORNEYS

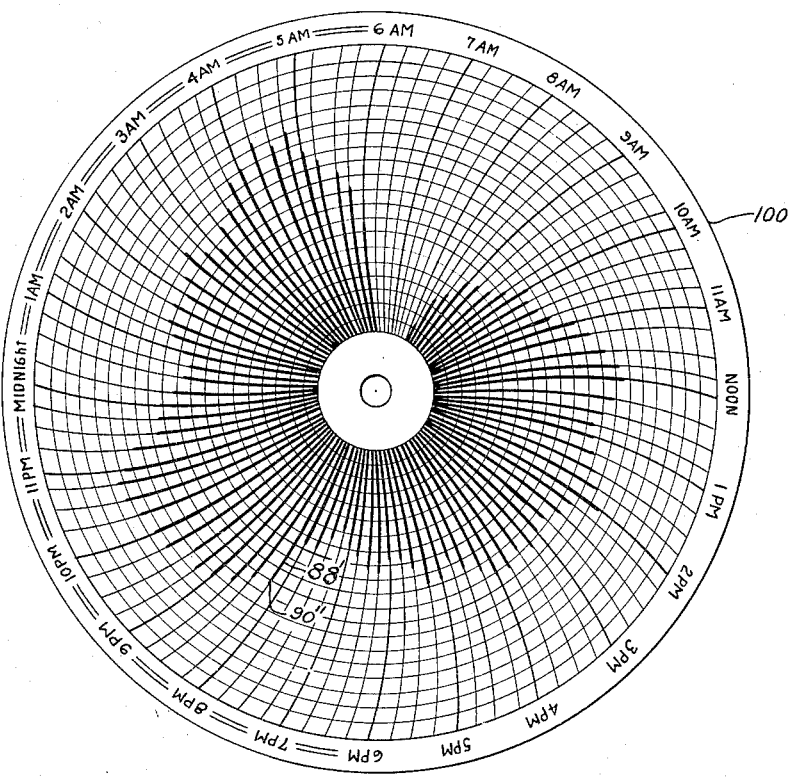
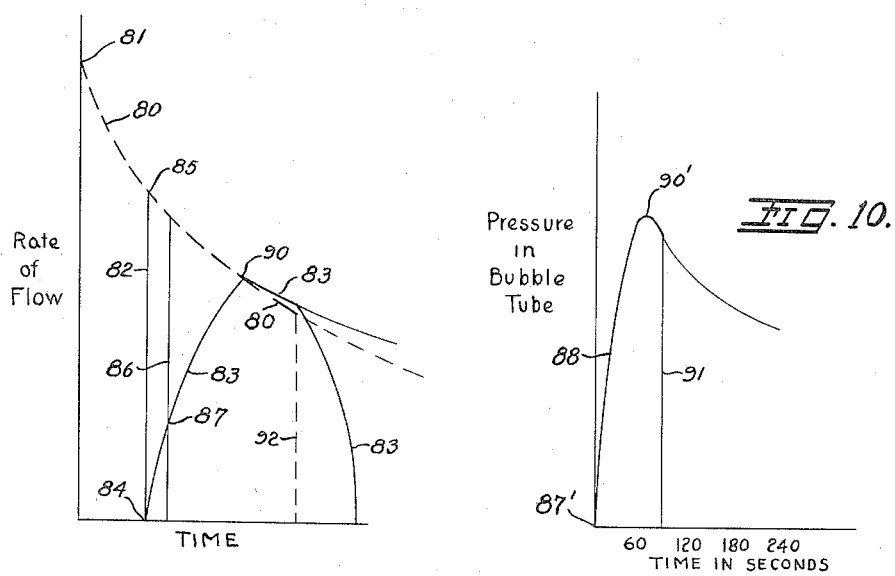

United States Patent Office 2,734,378
Patented Feb. 14, 1956

2,734,378

FILTERABILITY TESTING OF SUSPENSIONS OF SOLIDS IN A LIQUID

Sidney E. Meyers, Rochester, N. Y., assignor, by mesne assignments, to Wood Conversion Company, St. Paul, Minn., a corporation of Delaware Application September 29, 1951, Serial No. 248,948

12 Claims. (Cl. 73—63)

This invention relates broadly to the testing of the filterability of a suspension of solids in a liquid. An important and commercially useful application of the broad principles of the invention relates to the testing of the quality of freeness of fiber suspensions employed in the manufacture of paper, fiberboard and the like, from lignocellulose fibers such as are obtained in wood pulp stock.

The quality of freeness is evaluated quantitively by measurement of the rate of flow of liquid through a mat of the fiber being tested. In technical usage the antonym, or reciprocal, of freeness is termed slowness. The determination and control of freeness is necessary because this quality of the pulp stock affects the density and other properties of the product. Uniformity of the product requires a uniform freeness of the pulp.

In general mill practice, it is customary to extract samples of pulp from the stock in process from time to time, and determine freeness in the laboratory. In the conventional laboratory test, a measured volume of dilute suspension of the pulp is removed from the stock in process and poured into a container having a screened or perforated bottom end. A mat of pulp forms on the upper surface of the screen as the water flows through the pulp and screen, and the value of freeness is expressed in terms of water volume passed in a given time. By the time the results are known, the conditions at the moment of sample extraction have passed, and in most cases it is too late to make appropriate correction by re-refinement or otherwise. Also, it is known by persons skilled in the art that the evaluation of freeness obtained by such a test is affected by the consistency and temperature of the pulp suspension and also by the hydration and physical dimensions and condition of the fiber contained in the suspension. Thus, any change in tempearture of the sample before or during the test affects the accuracy of the test. Also, in conventional mill operation, all of these qualities of the stock change from time to time, making it difficult to correlate the test results under the different conditions which arise. To attenuate these variations to an acceptable average, it is the practice to employ tanks or chests for temporary storage and mixing of large quantities of the refined stock.

A general object of the invention is to provide an improved filterability test for a filterable suspension of solids in a liquid, and especially for the purpose of measuring some one variable quality affecting filtration, such as freeness, in a controlled process where the other qualities affecting the filtration characteristics are held substantially constant.

It is, accordingly, an important object to provide an improved freeness testing apparatus which is suitable for the direct control of the mill processes as distinguished from the conventional laboratory type test. Another object is to provide an improved freeness testing apparatus which is less affected by changes in other qualities of the pulp, such as consistency and temperature, than the conventional laboratory test. Another object is to provide an improved apparatus which is adapted to the taking of samples of the stock at strategic places in the refining end of the stock system, so that a running and virtually instantaneous record or indication is available for immediate manual or automatic adjustment of the refining equipment to obviate the necessity for temporary storage and associated pulp handling equipment. Another object is to provide improved apparatus for the intermittent and automatic determination and recording of the pulp freeness in chart form without manual attention. Another object is to provide an apparatus in which certain disturbing variables in conventional laboratory tests are maintained constant and in which the human element in such tests is entirely eliminated.

The apparatus of the present invention is adapted to be used at timed intervals by automatic equipment which will keep its own record on suitable charts. Such equipment may be located as desired to indicate the freeness at different points in the stock system, and, obviously, the factors which affect freeness may then be directly controlled by the automatic equipment. The freeness tester is supplied with a continuous flow of stock for sampling purposes, whereby any change in the condition of the stock is promptly communicated to the freeness tester without lag or variation which would introduce an error into the chart. Such a stock flow to the tester is diverted from the main stock system by a stock meter, preferably of the rotary type disclosed in my copending application, Serial No. 174,390, filed July 18, 1950, and entiled Liquid Metering Method and Apparatus, which is designed to prevent the inclusion of air and maintain uniform flow under the variations in head which may occur in the system. A timing device operating on a suitable cycle, such as fifteen minutes, schedules the various operations necessary to form a mat of pulp against a screen, measure the flow of water therethrough, and then remove the mat from the screen and wash the screen in preparation for the next test. The equipment includes novel apparatus for indicating the freeness at each test on a moving chart whereby the test results appear as lines at regular intervals on the chart.

The testing procedure comprises the formation of a mat of pulp and the filtering of water through the mat at constant head beneath a free liquid surface of the pulp. The first surge of water before an appreciable thickness of mat has formed is not significant and is not measured directly in the determination of freeness, but the total volume of filtrate is utilized in such a way as to provide an indication of the rate of flow of the filtrate at a significant point in the accretion of the mat filter and under identical conditions in every test. This is accomplished by allowing the first surge of water to fill up empty spaces in the apparatus, after which the flow continues into an empty orifice chamber from which the filtrate is allowed to escape at a variable rate depending upon the depth of filtrate above an escape orifice. The orifice chamber is tall and slender, and fills rapidly to some equilibrium level where the orifice discharge is equal to the input of filtrate. The maximum depth of filtrate attained in the orifice chamber is then measured in a novel manner to provide an indication of the rate of flow after the introduction of what may be referred to as the fill-up water.

In the manufacture of fiberboard, freeness tests conducted by this method show better correlation with the density and strength of the finished product than freeness readings obtained by conventional laboratory methods, and are less affected by other conditions of the stock, such as temperature, consistency, cooking time, chemical content, etc. At least, the results obtained by the present tests appear to be affected by such other conditions in about the same manner and degree as the properties of the product are affected and so the test results provide a better prognosticator of the product than has been available heretofore.

The apparatus of the invention is described in greater detail in the following specification with reference to a preferred embodiment of the apparatus illustrated on the accompanying drawings. It is to be understood, however, that the drawings are intended to illustrate the invention and not to limit the invention, and that various changes may be made in the construction and arrangement of the elements of the equipment without departing from the spirit of the invention.

In the drawings:

Figure 1 is a diagrammatic illustration of the apparatus employed to carry out the method of the invention;

Figure 2 is an enlarged longitudinal sectional view of the freeness chamber illustrated in Figure 1.

Figure 3 is an enlarged longitudinal sectional view of the orifice chamber illustrated in Figure 1;

Figure 4 is an enlarged longitudinal sectional view of an orifice member employed in the compressed air line in Figure 1;

Figure 5 is a schematic diagram of a timing device for scheduling the operation of the solenoid valves shown in Figure 1;

Figure 6 is a diagram illustrating the condition of the test apparatus just prior to a freeness test;

Figure 7 is a diagram illustrating conditions at the beginning of a freeness test;

Figure 8 is a diagram illustrating a later instant in a freeness test;

Figure 9 is a graph illustrating the variations in the rates of flow of filtrate through the mat in the freeness chamber, and the filtrate escaping from the orifice chamber;

Figure 10 is a graph of the pressure variation in the bubble tube in the orifice chamber; and Figure 11 illustrates a specimen chart produced by the recording instrument illustrated in Figure 1.

*Apparatus and mode of operation in general*

Stock to be tested is fed into a sampling pipe P by a rotary stock meter S operating continuously at constant speed to maintain a uniform rate of flow through the sampling pipe at a velocity just sufficient to carry the pulp in suspension upwardly without settling. Mounted in a vetrical leg of the sampling pipe P is an open bottom filtration chamber F which is shown in detail in Figure 2. This chamber is equipped with a screen to form a plup mat which passes filtrate over into orifice chamber O, illustrated in detail in Figure 3. In each test, water flows into orifice chamber O faster than it can escape, causing the water level to rise and create a pressure in a submerged bubble tube, which pressure is communicated to the recorder R. Thus, the rise in the liquid in orifice chamber O causes the pen in the recorder R to draw a line on the chart, recording the increasing depth of liquid attained in the chamber O until the maximum has been passed.

One such line is drawn in each test, the tests being scheduled according to a reoccurring cycle controlled by the timing device shown in Figure 5. The chart produced by the recorder R comprises a series of lines spaced in time according to the intervals between successive tests. In the present arrangement the timing device causes a new test to be completed every fifteen minutes, whereby the recorder R draws four lines on the revolving chart every hour to provide clear visible indication of any variation or trend in the stock freeness throughout the working day. Any undesirable changes in the freeness may be corrected before the trend has proceeded to the point where the properties of the product would be seriously affected.

*Apparatus in detail*

The numeral 10 designates stock at some point in the refinement process where it is desired to divert a sampling flow for freeness testing. If the stock is maintained at constant level at 10 it may be fed into the sampling pipe P by means of a submerged weir or other suitable diversion means, but if the stock level is not constant it is preferred to use a motor driven stock meter, as indicated at S, of a type such as referred to hereinabove wherein the rate of delivery will not fluctuate within the range of variations in the head to be experienced. Stock to be tested is thus discharged by the stock meter S into the downward leg 11 of the sampling pipe P at a rate sufficient to prevent changing the uniformity of the suspension in the upward leg 12 containing the filtration chamber F. The upward leg 12 terminates in a lip 13 over which the stock overflows continuously into a receptacle 14 having an outlet pipe 15. It is to be understood that the stock meter S does not handle the whole output of the refinement process, but only a small part sufficient for sampling purposes, and that this part is returned through pipe 15 to the source 10, from which it was diverted. By reason of the submergence of filtration chamber F in the stock in the rising leg 12, and the short length of the sampling pipe P, the filtration chamber is maintained at the same temperature as the source of stock at 10, and any change in condition of the stock at 10 is communicated promptly to the region of the filtration chamber.

Referring now to Figure 2, the filtration chamber F comprises a short cylindrical tube 20 having an open lower end 21 maintained at a fixed depth H below the overflow lip 13. Good results are obtained with a value of 16" for this distance in very free stock. A short distance above the lower end 21 there is mounted a horizontal screen 22 which preferably comprises a perforated metal plate. In the course of a test, a mat of stock collects beneath this perforated plate, and filtrate water passes through the mat and plate and is carried away by an outlet pipe 23. Pipe 23 is located as close as possible to screen 22 to minimize the head over the screen. The upper end of the tube is sealed by a cap 24 carrying three small pipes 25, 26 and 27.

Pipe 26 is connected with an orifice member 30a, which is in turn connected with compressed air supply pipes 31 and 32. Pipe 32 is connected with a source of air pressure, and is equipped with a manual valve 33 and a conventional pressure reducing valve 34 which maintains a constant pressure of approximately 5 pounds per square inch above atmosphere in the supply pipe as indicated by presssure gauge 35.

Pipe 32 also connects with a pipe 36 which is likewise equipped with an orifice member 30b leading to a bubble tube 40 and a branch pipe 41 connected with the air pressure responsive recording indicator R. The end of branch pipe 41 may be opened to atmosphere by a normally closed solenoid valve A, and the previously mentioned pipes 25 and 27 are similarly equipped with normally closed solenoid valves B and C. Pipe 25 connects with a supply of wash water which is admitted to the filtration chamber F when valve B is opened. Pipe 27 serves as an air vent for the filtration chamber, the end of this pipe being open to atmosphere when valve C is opened.

Filtrate water discharged through outlet pipe 23 of the filtrate chamber F is conveyed to the orifice chamber O through a U-shaped water seal having a downflow leg 45 and an upflow leg 46 connected with the orifice chamber O through a horizontal pipe 47. The upper end of pipe 46 is open to atmosphere, and, to fulfill its purpose as a water seal, the length of this pipe from its lower end up to its connection with pipe 47 must exceed the previously mentioned hydrostatic head H existing above the lower end of filtration chamber F.

One of the orifice members, designated generally by the numeral 30, is illustrated in cross section in Figure 4. These orifice members, which are identical, allow a restricted flow of air into the pipe 26 and the bubble tube 40, and maintains the desired constant pressure in pipes 31 and 36 so that this pressure does not fall when either or both of the pipe 26 and bubble tube 40 is open to atmosphere. The 5-pound pressure maintained in pipes 31 and 36 exceeds the maximum hydrostatic pressure at the lower ends of pipe 26 and bubble tube 40, whereby air escapes constantly from this pipe and tube when they are submerged, as well as when they are open to atmosphere.

The construction of orifice chamber O is best shown in Figure 3. This chamber comprises a long slender cylindrical tube 50 having its upper end open to atmosphere and equipped with a perforated cap or spider 51 to support the bubble tube 40 in a central position, as shown. The lower end of tube 50 is fitted with a cap 52 equipped with an orifice member 53 having an orifice 55 with a round edge entrance portion 56. A stilling disc 57 is supported just above the orifice to prevent eddies and cavitation in the liquid. Bubble tube 40 terminates just above stilling plate 57 and is equipped with a bell fitting 58. Water discharged through orifice 55 is disposed of by a drain 59. The chamber O is equipped with an overflow pipe 48 directly opposite the pipe 47 to take care of overflow if the apparatus should inadvertently go through its program with clear water or scanty solids suspension.

Referring now to Figure 5, the solenoid valves A, B and C are represented by their respective solenoids which are designated by the same reference characters. The valves are closed when the solenoids are deenergized and open when the solenoids are energized. These solenoids are energized and deenergized by the respective switches 61, 62 and 63 in series with a source of supply voltage 64. The switches are opened and closed at the proper times by three cams 65, 66 and 67, represented as mounted on a shaft 68 from a synchronous motor time clock 70. Thus, the three switches are opened and closed in a predetermined program forming a repeating cycle as the cam shaft 68 revolves continuously in the same direction at constant speed. For the present purpose, the shaft 68 is geared to make one revolution in fifteen minutes. It is to be understood that metallic contact switches operated by single cams are shown merely for convenience of illustration, and that the switches, in practice, may comprise mercury switches actuated by separate on and off cams as embodied in conventional mechanism manufactured for this purpose which is well known in the art.

The actuating cams are adjusted to produce the following schedule of operations of the solenoid valves A, B and C, in a fifteen minute repeating cycle, suitable for very free lignocellulose fiber stock:

| Time | Event | After the Event | | |
|---|---|---|---|---|
| | | A | B | C |
| 0 Seconds | Open valve C | Closed—air in bubble pipe. | Closed—no water. | Open to atmosphere. |
| 120 Seconds | Open valve A | Open—bubbling stops. | do | Do. |
| 145 Seconds | Close valve C | do | do | Closed—air on filter. |
| 327 Seconds | Open valve B | do | Open—water | Do. |
| 437 Seconds | Close valve B | do | Closed—no water. | Do. |
| 440 Seconds | Close valve A | Closed—air in bubble pipe. | do | Do. |

Operation

Just prior to the beginning of each operating cycle controlled by the timing device 70 in Figure 5, the switches 61, 62, 63 are all open and the three solenoid valves A, B and C are closed, as illustrated in Figure 6. Air entering the filtration chamber F through pipe 26 bubbles out around the lower edge 21, keeping the entire chamber empty of pulp and water. Stock rises slowly past the filtration chamber but cannot enter because of the internal air pressure. The water level in leg 45 of the U-shaped seal tube is depressed by the air pressure in the filtration chamber a distance equal to the head H, the water in the right leg 46 having a free surface at atmospheric pressure at the level of pipe 47. Orifice chamber O is empty and air issues freely from bubble tube 40 at atmospheric pressure, allowing the indicator arm in recorder R to remain in its atmospheric pressure position.

At the beginning of a fifteen minute cycle, cam 67 closes switch 63 to energize and open solenoid valve C, allowing the air in filtration chamber F to escape to atmosphere without measurable resistance allowing pressure in chamber F to fall to atmospheric. The water in pipes 45, 46 balances at the same level in both pipes, both now being open to atmospheric pressure. Water and pulp immediately rush into the lower end of the filtration chamber, the pulp being stopped by the screen 22 and the water passing therethrough to the outlet pipe 23 and flowing over into leg 45. When both legs 45 and 46 are filled up to the level of pipe 47, the flow begins to discharge into orifice chamber O, as shown in Figure 7. Water escapes from the bottom of orifice chamber O through the orifice 55 at a variable rate, depending upon its depth above the orifice. Until the bell 58 becomes submerged, atmospheric pressure continues to exist in bubble tube 40 and pipe 41, causing the indicating arm of recorder R to remain at the atmospheric pressure line.

The curve 80 in Figure 9 indicates the changing rate of flow of water through the mat screen 22 plotted against time, although this rate of flow is not indicated or measured in its incipient stage by the present apparatus. The impedance of the clean screen limits the initial flow to some finite value, as indicated at point 81. If there were no solid material in the stock, the flow through screen 22 would continue at approximately this rate, but, owing to the building up of a porous mat of pulp beneath the screen 22, the flow rapidly diminishes with time, as indicated by the downward trend of the line 80. Vertical line 82 indicates the instant in time when water begins to enter the orifice chamber O through pipe 47 and is discharged through orifice 55. Curve 83 represents the rate of flow through orifice 55, beginning at point 84. By this time the flow through screen 22 has dropped to the value indicated at point 85. Orifice 55 is made small enough to require a considerable pressure head in order to discharge water as fast as it enters the slender orifice chamber O, and so the depth of water rather quickly increases in this chamber.

At a later instant in time, represented by the vertical line 86 in Figure 9, the water in orifice chamber O has risen to close the mouth of bell 58, as shown in Figure 7. The rate of flow through orifice 55 now has attained the value indicated by the position of point 87 in Figure 9, where line 86 intersects the curve 83. As the water continues to rise in orifice chamber O, air is discharged from the lower end of bubble tube 40 at a pressure equal to the hydrostatic pressure of the water at that level, whereby the air pressure in the bubble tube serves as a measure of the head above the lower end of the bubble tube. This pressure is communicated through pipe 41 to the pressure responsive indicating and marking arm of the recorder R, causing this arm to move to the left as shown in Figure 8, to indicate and record the magnitude of the hydrostatic head.

In Figure 10, the bubble tube pressure is plotted against time at a scale selected to show the rate of variation in pressure with the rise of the water in the orifice tube. This curve, designated by the numeral 88, starts at zero at the point 87' which corresponds to the point 87 in Figure 9. The shape and height of the curve are governed by the variable rate of input through pipe 47 and the variable rate of output through orifice 55. As the pulp mat continues to build up under the screen 22, the rate of flow of water through the screen 22 continues to diminish following the curve 80, until, at some point 90, the discharge of water from the orifice chamber is equal to its intake, and then the water level does not rise any higher in the orifice chamber. The pressure in the bubble tube 40 is then at a maximum, as indicated at the point 90' in Figure 10, causing the indicating arm in Figure 8 to indicate its maximum reading on that particular test.

If the mat were allowed to build up to a still greater thickness, the water flow through screen 22 would continue to diminish on the line 80, and the curve 83, indicating the rate of flow through orifice 55, would closely follow the curve 80 with a slight lag in time, as shown in Figure 9. The present test, however, is not concerned with the remaining diminishing portions of the curves 80 and 83, and so, at 120 seconds, the valve A is opened to exhaust the bubble tube to atmosphere and allow the pressure to drop abruptly, as indicated by the vertical line 91 in Figure 10. Shortly thereafter, at 145 seconds, valve C is reclosed, causing the air flow from pipe 26 to drive the water out of the filtration chamber F and terminate the transfer of water to the orifice chamber O. Curve 80 then descends abruptly on the vertical line 92 in Figure 9, and curve 83 drops off less abruptly as the orifice chamber empties itself through the orifice 55.

When the valve C is reclosed, the water standing in pipes 45 and 46 is discharged with a surge into the orifice chamber O until the water in pipe 45 is depressed again to balance the external head H as shown in Figure 6. In order to avoid a spurious reading on the instrument R, the valve A is opened before the valve C is closed, as described hereinabove. This surge of water in clearing the pipe 45, therefore, has no significance in the test and is not taken into consideration in the curve 83 in Figure 9. The remaining water in pipe 46 has a greater available head than the vertical distance H to hold the pressure in the filtration chamber and cause the mat to be pushed away from the screen 22 and discharged from the filtration chamber as air continues to flow from pipe 26 into the filtration chamber. At 327 seconds, solenoid valve B is opened to discharge fresh water into the filtration chamber to clean the screen. At 437 seconds, this water is shut off, and then at 440 seconds valve A is closed in preparation for another test in the next cycle.

Figure 11 illustrates a circular chart 100 produced by the recorder R. Each line 88' is a trace of the curve 88 shown in Figure 10, but, since the chart requires twenty-four hours to make a complete rotation, the pen moves out and back on the same line and does not show the shape of the curve as revealed in Figure 10. The end of each stroke, however, at 90'', corresponds to the peak of the curve at 90' in Figure 10, and these points are utilized to give the desired indication of freeness in the present test. As the freeness varies from test to test, the successive lines 88' will be of different length and spaced rather closely together on the chart at 15 minute intervals. These lines, accordingly, form a significant pattern to indicate the exact value of freeness at any time, and to indicate at a glance whether the values are tending to increase or decrease relative to the optimum desired value of freeness. The particular chart illustrated in Figure 11 was selected to show the variation in the indication produced on a day when the freeness was unusually erratic, and shows the need for the present invention to assist in achieving greater stability in the refining process. The goal of efficient mill operation is, of course, to keep the freeness and other qualities nearly constant and close to their optimum values, and to prevent the wide fluctuations shown on the chart in Figure 11.

The flow through an orifice varies as the square root of the head or depth of liquid above the orifice, and so, conversely, it may be said that the head varies as the square of the rate of flow through the orifice. This relationship is utilized to advantage in the present method and apparatus, wherein the heights of the peaks of the curves at 90' and 90'' in Figures 10 and 11 in different tests thus vary as the squares of the heights of the points 90, it being remembered that the curve in Figure 10 is a pressure curve while the curves in Figure 9 are rate of flow curves. This mathematical relationship provides an inherent multiplier without lost motion or moving parts to make small variations in the maximum recorded rates of flow in successive tests readily apparent and readable on the chart. The head and other external conditions under which the mat is formed are maintained constant whereby the only variables affecting the rate of flow of water through the mat and screen are the qualities of the stock itself. Throughout the test the pulp mat is pressed against the screen by a constant hydrostatic pressure slightly in excess of one-half pound per square inch.

Other advantages of the present apparatus are that the stock and filtrate are not handled by valves or other moving parts, and the recorder is not affected by slight leakage or faulty solenoid action, since there is no closed air chamber which is required to hold a pressure for a period of time. The filtrate flow into the orifice chamber O is visible and may be observed or collected if desired. Maintenance and operating costs are but a small fraction of the cost of the conventional laboratory test procedure.

It will be observed from the schedule of valve operations that the performance of the freeness test and the washing of the screen occupy only a part of each 15 minute cycle. The tests may be performed at much more frequent intervals, if desired. However, it is to be understood that the values of air pressure, time intervals, physical dimensions and the like are merely illustrative for a very free lignocellulose stock and are not intended to limit the invention. For other types of suspensions the specified values might be quite different, as will be appreciated by persons skilled in the art.

The hereinabove described testing apparatus is applicable to indicating and recording the filtration characteristics of any suspension of solids in any liquid, so long as the suspension is filterable and a foraminous membrane is obtainable which permits backwashing and continued use for a reasonable period. When applied to suspensions of lignocellulose fibers, as in the mill process referred to, the consistency and temperature of the suspension are held constant so that the freeness as affected by refining may be known. This precaution is taken to reduce the number of variable factors, notwithstanding the fact that the present apparatus is believed to be affected thereby less than conventional testing apparatus. Both consistency and temperature are readily controllable by the usual consistency and temperature controllers known in the art. Under such conditions the filterability indicated by the recorder provides an accurate measure of what may be called "absolute freeness." As a corollary, it will be apparent to persons skilled in the art that the variations in air pressure which actuate the present recorder may also be used to control those steps in the refining process which regulate the freeness, whereby the freeness may be automatically maintained very close to its optimum value to attenuate the wide fluctuations illustrated in the chart of Figure 11.

If the apparatus is employed only to determine the relative freeness as the suspension moves along in the process, as distinguished from the "absolute freeness," it may be unnecessary to control consistency. In such case, the recorder would show only whether or not the combination of consistency, freeness, temperature effects, etc., which may be referred to collectively as "filterability," maintained some uniform value.

When other types of solids, organic or inorganic, are involved, the same principle applies, namely, that with concentration constant the filterability is known, dependent, usually, on a combination of particle size distribution and the condition of the surface of the particles. If these latter factors are constant, the device would then measure variations in concentration of the suspension. If the sample stream of suspended solids contains solids of constant characteristics in a constant concentration, the device could be used to measure variations in the liquid characteristics, such as, for example, viscosity.

Having now described my invention and in what manner the same may be used, what I claim as new and desire to protect by Letters Patent is:

1. In a filterability tester, a filtration chamber having an open lower end and containing a mat forming screen, a filtrate outlet communicating with said chamber above said screen, and means for continuously moving a suspension of solids in a liquid upwardly toward and around said filtration chamber at a rate sufficient to prevent change in the uniformity of the suspension, said chamber being submerged in said liquid.

2. In a filterability tester, a vertical conduit for a suspension of solids in a liquid, means for continuously moving said suspension upwardly through said conduit at a rate sufficient to prevent change in the uniformity of said suspension, a filtration chamber having an open lower end submerged in and surrounded by said upwardly moving suspension, a mat forming screen in said chamber, and a filtrate outlet connected with said filtration chamber above said screen.

3. In a filterability tester, a vertical conduit having a discharge lip at the upper end thereof, means for moving a suspension of solids in a liquid upwardly through said conduit at a rate sufficient to prevent change in the uniformity of said suspension, and a filtration chamber mounted in said conduit in spaced relation to the wall of the conduit to provide an annular passage around said chamber for said upwardly moving liquid, said filtration chamber having an open lower end equipped with a mat forming screen positioned at a distance beneath said discharge lip.

4. In a filterability tester, a vertical U-shaped conduit, means for feeding a suspension of solids in a liquid at a constant rate downwardly into one leg of said conduit for upward movement through the other leg of said conduit, a filtration chamber having an open lower end submerged in said upwardly moving suspension in said other leg of said conduit, a mat forming screen in said filtration chamber, and a filtrate outlet communicating with said filtration chamber above said screen, said chamber being spaced from the wall of the conduit so as to be surrounded by said upwardly moving suspension.

5. In a filterability tester, a filtration chamber having a mat forming screen, an air pressure connection to said chamber, an orifice chamber having an orifice in the lower end thereof, a U-shaped filtrate pipe communicating with said filtration chamber for conveying filtrate to said orifice chamber, said filtrate pipe forming a water seal of sufficient depth to sustain the air pressure developed in said filtration chamber and prevent loss of pressure through said filtrate pipe, and means for measuring the depth of liquid in said orifice chamber.

6. In a filterability tester, a filtration chamber having a mat forming screen, an orifice chamber having an orifice in the lower end thereof, a filtrate outlet from said filtration chamber communicating with said orifice chamber, a compressed air supply, a pipe communicating with said filtration chamber connected with said compressed air supply, an orifice member restricting the flow of air from said supply to said filtration chamber, a water seal in said filtrate outlet of sufficient depth to sustain the air pressure developed in said filtration chamber and prevent loss of pressure through said filtrate outlet, a bubble tube in said orifice chamber, an air pressure responsive indicator connected with said bubble tube, and an orifice member connected between said compressed air supply and said bubble tube to restrict the supply of air to said bubble tube.

7. In a filterability tester, a submerged open bottom filtration chamber having a mat forming screen therein, filtrate conduit means connected with said chamber above said screen and having storage capacity for a quantity of the initial surge of filtrate in a test, a compressed air supply connected with said chamber to empty the chamber after a test and expel from said conduit means an amount of filtrate equal to said quantity, and means for measuring the rate of flow of the discharge from said conduit means in a test.

8. In a filterability tester, a submerged open bottom filtration chamber having a mat forming screen therein, a compressed air supply connected with said chamber, a valve for connecting said chamber with atmospheric pressure, and a U-shaped water seal filtrate pipe connected with said chamber, said filtrate pipe having a discharge leg of a height exceeding the depth of submergence of said filtration chamber whereby when said atmospheric pressure valve is closed compressed air admitted to said chamber will empty the chamber and remove a predetermined quantity of water from said filtrate pipe without breaking the water seal in said pipe so that said filtrate pipe will then have storage capacity for initial surge of filtrate before it starts to discharge in a test operation.

9. In a filterability tester, a submerged open bottom filtration chamber having a mat forming screen in the lower portion thereof, means for admitting atmospheric pressure to said chamber above said screen for a mat filtration test, a filtrate pipe connected with said chamber and having means for storing a quantity of filtrate equal to the initial surge of filtrate in the incipient stage of mat formation on said screen and then discharging the remainder of the filtrate, and means comprising a compressed air supply connected with said chamber for emptying said chamber and removing said quantity of stored filtrate from said filtrate pipe.

10. In a filterability tester, a submerged open bottom filtration chamber having a mat forming screen therein, a compressed air supply connected with said chamber, a valve for connecting said chamber with atmospheric pressure, and a water seal filtrate discharge pipe connected with said chamber, said water seal having a depth exceeding the depth of submergence of said filtration chamber to sustain the pressure of said compressed air in said chamber without loss of air through said filtrate pipe.

11. In a filterability tester, a vertical conduit, a stock meter arranged to feed a slurry to be tested upwardly through said conduit continuously at a constant rate of flow, and a submerged open bottom filtration chamber having a mat forming screen therein mounted in said conduit in spaced relation to the wall thereof whereby said chamber is surrounded on all sides by the slurry and thereby maintained at the same temperature as the slurry.

12. In a filterability tester, a vertical U-shaped conduit, a stock meter arranged to feed a slurry to be tested continuously at a constant rate downwardly into one leg of said conduit for upward movement through the other leg, said other leg having an overflow lip to maintain a free surface on the overflowing slurry at a constant level, and a submerged open bottom filtration chamber having a mat forming screen therein, said chamber being mounted in said other leg of said conduit in spaced relation to the wall thereof and at a distance below said overflow lip.

(References on following page)

References Cited in the file of this patent

UNITED STATES PATENTS

| | | |
|---|---|---|
| 1,838,614 | French | Dec. 29, 1931 |
| 1,840,101 | Jespersen | Jan. 5, 1932 |
| 1,931,274 | Thomas | Oct. 17, 1933 |
| 2,027,660 | Wells | Jan. 14, 1936 |
| 2,345,464 | De Giers | Mar. 28, 1944 |
| 2,471,932 | Chaplin | May 31, 1949 |

FOREIGN PATENTS

| | | |
|---|---|---|
| 366,129 | Germany | Dec. 29, 1922 |